March 13, 1945.  E. E. GRIFFITHS  2,371,516
HEAT REGULATING MEANS FOR LIQUID HEATING APPARATUS
Filed Jan. 4, 1943
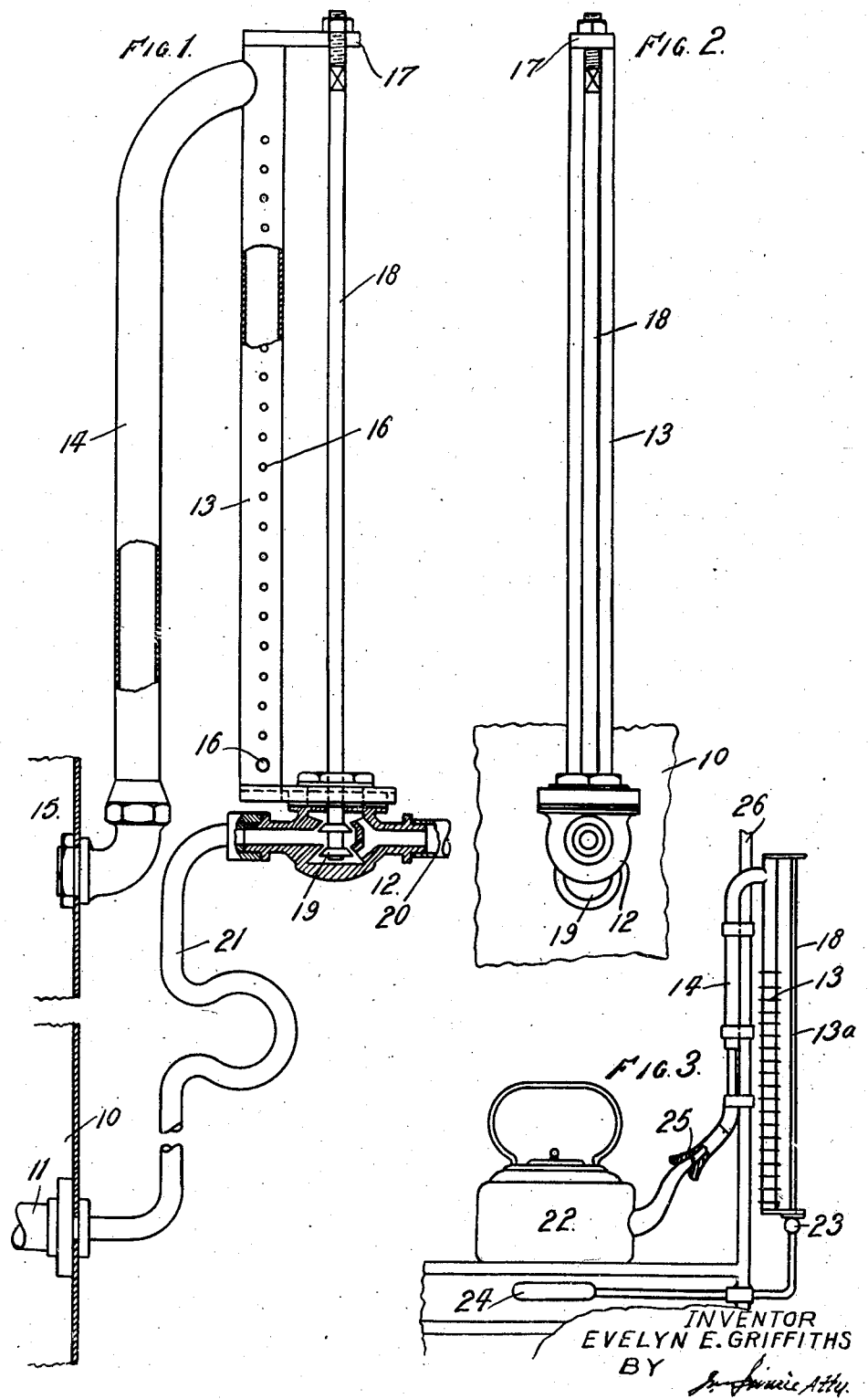
INVENTOR
EVELYN E. GRIFFITHS
BY Patented Mar. 13, 1945

2,371,516

UNITED STATES PATENT OFFICE 2,371,516

HEAT REGULATING MEANS FOR LIQUID HEATING APPARATUS

Evelyn Edwin Griffiths, Wirral, England

Application January 4, 1943, Serial No. 471,285
In Great Britain February 7, 1942

8 Claims. (Cl. 236—33)

This invention is for improvements in or relating to means for regulating the heat supply to liquid heating apparatus of the kind in which a member, forming the heat responsive part of a thermostat, is subjected to the temperature of evaporate from the heating apparatus and the thermostat is operatively connected to means, such as a valve or electric switch, controlling the heat supply to such apparatus, so that the intensity of boiling and rate of evaporation is controlled automatically and maintained at the required degree. Regulating means of this kind have been used on sterilising apparatus in which the sterilising agent is water maintained at boiling temperature. In such apparatus the temperature cannot rise above the boiling point of water until the whole of the water has been evaporated. If therefore the heat supply be regulated so as to ensure the continuous production of a small quantity of steam, for example sufficient to be visible, articles immersed in the water will continuously be subjected to a temperature of approximately 212° F. without the possibility, so long as any water remains, of their being subjected to a temperature substantially above 212° F. which would damage them. If, however, the heat supply be more than sufficient to generate a comparatively small quantity of steam there will be a waste of heat and considerable inconvenience will be experienced by the generation of an unnecessary amount of steam. The latter state of affairs often results from the fact that in setting the apparatus to work it is desired to raise the water quickly from atmospheric temperature to boiling point, and when this is accomplished, without subsequent control, the heat continues to be supplied at this rate with resultant waste of heat and generation of unnecessary steam. Even when the heat supply is regulated so as to reduce the rate after the water has been boiled, it is difficult by hand-setting to avoid, on the one hand, the temperature of the water falling below boiling point and, on the other hand, a waste of heat and production of an unnecessary quantity of steam.

With regulating means of the above mentioned kind as used heretofore, the heat responsive member is usually located in an enclosed space or chamber which receives evaporate from the heating apparatus. One serious disadvantage of this arrangement is that, while the thermostat shuts off the heat supply to the heating apparatus when the heat responsive member is subjected to steam and its temperature raised to the required extent, there is, when more heat is called for, a lag before the responsive member cools down sufficiently to bring the heat supply on again and the liquid in consequence ceases to boil. The reason for this lag is that, being enclosed in a restricted space and often partly immersed in an atmosphere of steam, the heat responsive member can only lose its heat very slowly. Furthermore, the comparatively small loss of heat from the surface of the heat responsive member is, to a substantial extent, offset by a "creeping" conduction of heat along the responsive member which causes sluggishness and prevents a precise or "dead beat" operation of the valve.

One object of the present invention is to utilise the chamber which receives the evaporate from the heating apparatus, as the member which, by its thermal expansion and contraction, operates the means controlling the heat supply to the apparatus.

A further object of the invention is to overcome the above mentioned defects in heat regulating apparatus of the kind concerned, by providing in combination with a liquid heating apparatus having an outlet for evaporate, a temperature responsive chamber having a lineal expansion dependent only (for all practical purposes) on the rate of admission of evaporate to the chamber, a conduit connecting said chamber to the evaporate outlet, means controlling the heat supply to the heating apparatus and an operative connection between the walls of the temperature responsive chamber and said heat controlling means, whereby thermal expansion and contraction of the chamber operate the heat controlling means.

The present invention also provides in combination with a liquid heating apparatus having an outlet for evaporate, a temperature responsive chamber external to the heating apparatus, a conduit connecting said chamber to the said evaporate outlet so as to maintain a column of evaporate in the chamber, the length of which is dependent on the rate of admission of evaporate to the chamber, means controlling the heat supply to the heating apparatus, and an operative connection between the walls of the temperature responsive chamber and the said heat controlling means whereby thermal expansion and contraction of the chamber, as the length of the column of evaporate varies, operate the heat controlling means.

The statement that the temperature responsive chamber is external to the heating apparatus means that it is in such a position that it is not influenced directly, to any substantial extent, by the heat conditions in the apparatus but only, so far as the heating apparatus is concerned, by the evaporate it receives therefrom. In other words, the chamber is external to the actual heating means and the liquid being heated although it may form part of the apparatus taken as a whole.

It will be seen that in effect the chamber itself constitutes the temperature responsive member of a thermostat. Such construction enables the heat responsive member to have a relatively large surface exposed to the surrounding atmosphere and so to cool down relatively rapidly should the rate of boiling fall below the desired level and the vapour in consequence cease to fill a predetermined portion of the chamber.

For certain rates of boiling the temperature responsive chamber may be only partly filled with vapour due to its area of exposed surface giving off heat at a rate which causes the amount of vapour entering the chamber to be condensed before it has traversed the chamber and reached the outlet. In such a case the walls of the portion of the chamber which is filled with vapour will be at approximately vapour temperature and the remaining portion of the chamber walls will be at or about atmospheric pressure. The overall lineal expansion of the chamber will depend on the proportion of the length of the chamber which is filled with hot vapour.

As the amount of the chamber which is so filled with vapour depends on the rate of hot vapour passing into the chamber it will be seen that the construction has the advantage of affording a graded operation of a control valve and not merely an "on" and "off" action.

It is in most instances advantageous for the chamber walls to be constructed of relatively thin substance (preferably metal) as this gives the chamber or any part thereof a speedy expansional response to the sudden presence or absence of hot vapour due to the resultant small mass of the chamber walls having a total heat content which is relatively low and quickly dissipated by their comparatively large surface exposed to the surrounding atmosphere.

In actual practice it is usually found that when the liquid in the vessel has reached its boiling point it almost instantaneously attains a high rate of ebullition and the rush of vapour given off fills the temperature responsive chamber. This causes the control valve to close completely or to a minimum setting and the rate of ebullition and vapour emission is reduced. When this occurs it is most important, particularly in the case of sterilisers, that the portion of the temperature sensitive member from which the vapour has receded should rapidly fall in temperature so as to prevent the control valve being kept closed beyond the amount which is required to ensure that the liquid is maintained at the desired rate of boiling. The apparatus, according to the invention, is particularly effective in this requirement.

Conveniently, the temperature responsive chamber is in the form of a long tube, preferably a thin-walled tube. Such a tube has a low heat capacity and there is very little heat conduction along the tube. This helps to ensure that the response of the temperature responsive chamber is proportional to the amount of vapour passing to the tube and the length thereof which is filled with vapour. Condensation in a long tube will tend to stabilise the vapour at a level in the tube dependent on the rate at which vapour is being generated.

Preferably the temperature responsive chamber is provided with one or more vapour discharge holes or cooling fins intermediate its ends. The steam inlet to the chamber is arranged so that, at the required rate of boiling and vapour generation, hot vapour will fill the chamber up to say, the first hole or fin and if the rate of boiling remains substantially constant, the vapour level will, due to the provision of the leak-off hole or fin, stabilise itself at this position. The expansion of the chamber at this stage may be such that there is a partial closing of the means controlling the heat supply to the heating apparatus. If there is an appreciable rise in the rate of vapour generation above the required amount, and in excess of what can be passed by the leak-off hole or condensed by the fin, a further portion of the chamber will be filled with vapour say up to the next leak-off hole or fin and the control valve will be closed to a further extent. This process will continue until the valve is closed sufficiently to reduce and stabilise the rate of boiling within a small margin of that required. It will be seen that the chamber fills with steam in a series of stages and there is a stage by stage and "dead beat" (i. e., non-fluttering) operation of the valve.

It may be desirable to arrange the leak-off hole or holes or fin or fins towards the end of the chamber remote from the vapour inlet because it is generally, and particularly with a steam control valve, only the last portion of the closing movement of the valve which is critical, the initial movement having little effect in reducing the flow of steam. With the present invention it is possible to bring the valve rapidly, by means of the regulator, to the critical controlling position after which the graduated control provided by the holes comes into operation.

It is preferable to arrange the heat responsive tube with its axis substantially vertical.

The invention will be further described by way of example, with reference to the accompanying drawing, whereon—

Figure 1 is a semi-diagrammatic side elevation, partly in section, of a heat regulator, according to the invention, applied to a steriliser for sterilising surgical instruments, Figure 2 is a front elevation of the regulator shown in Figure 1, and Figure 3 shows a regulator, according to the invention, adapted to control the boiling of a domestic kettle.

The steriliser comprises the usual tank-line boiler 10 having a hinged lid (not shown) at its upper part and a steam heating coil 11 located in its lower part. The flow of steam to the coil is controlled by a valve 12 and this valve is adjusted automatically, as hereinafter described, so as to maintain the water in the steriliser at any desired rate of boiling and with the production of only a small amount of steam. The heat regulator or thermostat comprises a vertical cylindrical temperature responsive chamber or downtake pipe 13 which has a thin wall and is relatively long and the upper end of which is connected, by an uptake pipe 14 (which, to some extent, acts as a condenser) to the evaporate space 15 of the boiler 10. The temperature responsive pipe has an opening to the atmosphere at its lower end, to provide a leak-off for any vapour or condensate which reaches this point, and may have one or more discharge holes 16, for the steam, extending along its length for the purpose hereinbefore set forth.

A laterally extending arm 17 is secured to the upper part of the pipe 13 and a rod 18, preferably of a metal having a low co-efficient of expansion, depends from this arm, to which it is adjustably secured, and forms an operative connection between the walls of the temperature responsive pipe 13 and the steam control valve 12. The casing of the valve is mounted on the lower part of the pipe 13 and the rod 18 acts directly on the valve member 19 and effects adjustments thereof in accordance with the expansion and contraction of the temperature responsive pipe as the pipe becomes filled with steam to a greater or lesser depth. The valve member 19 controls the passage of steam between a steam supply pipe 20 and a pipe 21 connected to the inlet end of the steam heating coil 11.

In a modification operation of the steam valve 12 is effected through a rod located within and extending vertically down the downtake pipe.

Preferably the downtake pipe is of a material such as copper, having a high co-efficient of expansion and the valve operating rod or bar is of an alloy such as a steel alloy having a low co-efficient of expansion so that the pipe forms the primary temperature responsive member of the thermostat.

Whilst the invention has been described, more particularly as applied to a steriliser, it also has other applications. For example, the regulator above described could be used for controlling the boiling of a domestic kettle, as shown in Figure 3, the steam from the spout of the kettle 22 being directed into a temperature responsive pipe 13, having cooling fins 13a, which is operatively connected to a gas valve 23 controlling the heat supply to a gas ring 24 for boiling the kettle. The pipe 13 is connected to the spout of the kettle by an uptake pipe 14 which is adjustable in length and has a flexible rubber mouthpiece 25 adapted to fit over the spout in a steam-tight manner. The heat regulator is conveniently clamped to the plate rack 26 of the gas stove.

In the case of an electrically heated apparatus the temperature responsive pipe could be arranged to act on a multiple switching arrangement controlling the supply of current to a combination of heating elements which are switched "on" or "off" as required. Where it is only necessary to switch the electricity "on" and "off" the temperature responsive pipe could be arranged to trip a switch "on" and "off" at predetermined points as it expands and contracts.

The cooling fins may extend longitudinally of the temperature responsive pipe instead of radially.

I claim:

1. A sensitive heat regulator for use in an apparatus having a vapor generating medium to be heated and a valve-controlled heating agent for such medium, said regulator comprising an elongated hollow element capable of longitudinal expansion under heat, said element being exteriorly and interiorly subjected to atmospheric conditions, means to establish free flow to the interior of the element of the vapor generated in the apparatus, and a member connected to and operated in any heat-responsive movement of the element to regulate the valve-controlled heating medium.

2. A sensitive heat regulator for use in an apparatus having a vapor generating medium to be heated and a valve-controlled heating agent for such medium, said regulator comprising a hollow elongated element open at the lower end and capable of longitudinal expansion under heat, the exterior of the element being fully exposed to the atmosphere, a conduit for delivering vapor of the heated medium to the interior of the element at approximately the upper end thereof, said element being formed to regulate its heat-responsive expansion in direct accordance with the rate of flow of the vapor thereto, and a member operated in the heat-responsive movement of the element to regulate the flow of the valve-controlled heating medium.

3. A construction as defined in claim 2, wherein the element is formed with means to provide successive vapor-discharge points to control the heat-responsive movement of the element in accordance with the rate of vapor flow.

4. A construction as defined in claim 2, wherein the element is fully open at the lower end.

5. A construction as defined in claim 2, wherein cooling fins are provided on the exterior of the element to provide heat-responsive movement of the element in accordance with the rate of vapor flow.

6. In combination with a liquid heating apparatus having an outlet for evaporate, an elongated temperature responsive pipe, a conduit connecting said pipe to said evaporate outlet, the temperature responsive pipe having vapor outlet means along the length of the pipe for the progressive discharge of vapor from the pipe, means controlling the heat supply to the heating apparatus and an operative connection between the walls of said temperature responsive pipe and said heat controlling means, whereby expansion and contraction of the pipe in accordance with the rate of admission of evaporate to said pipe operate the heat controlling means.

7. In combination with a liquid heating apparatus having an outlet for evaporate, an elongated tubular temperature responsive chamber having longitudinally perforated thin walls of low heat retentivity, a conduit connecting said chamber to the said evaporate outlet so as to maintain a column of evaporate in the chamber, the length of which is dependent on the rate of admission of evaporate to the chamber, means controlling the heat supply to the heating apparatus, and an operative connection between the walls of the temperature responsive chamber and the said heat controlling means whereby thermal expansion and contraction of the chamber, as the length of the column of evaporate varies, operate the heat controlling means.

8. In combination with a liquid heating apparatus having an outlet for evaporate, a long tubular temperature responsive chamber having thin longitudinally perforated walls of low heat retentivity, an uptake pipe extending from the evaporate outlet to said chamber so as to maintain a column of evaporate in the chamber, the chamber depending from the uptake pipe, a valve for controlling the heat supply to the heating apparatus, having its casing secured to the lower end of the chamber, and an operating rod having its lower end connected to a valve member in said casing for opening and closing ports therein, and its upper end connected to the upper end of the chamber, whereby said valve is operated by the thermal expansion and contraction of the chamber.

EVELYN EDWIN GRIFFITHS.